2,958,981
PLANT PROPAGATION

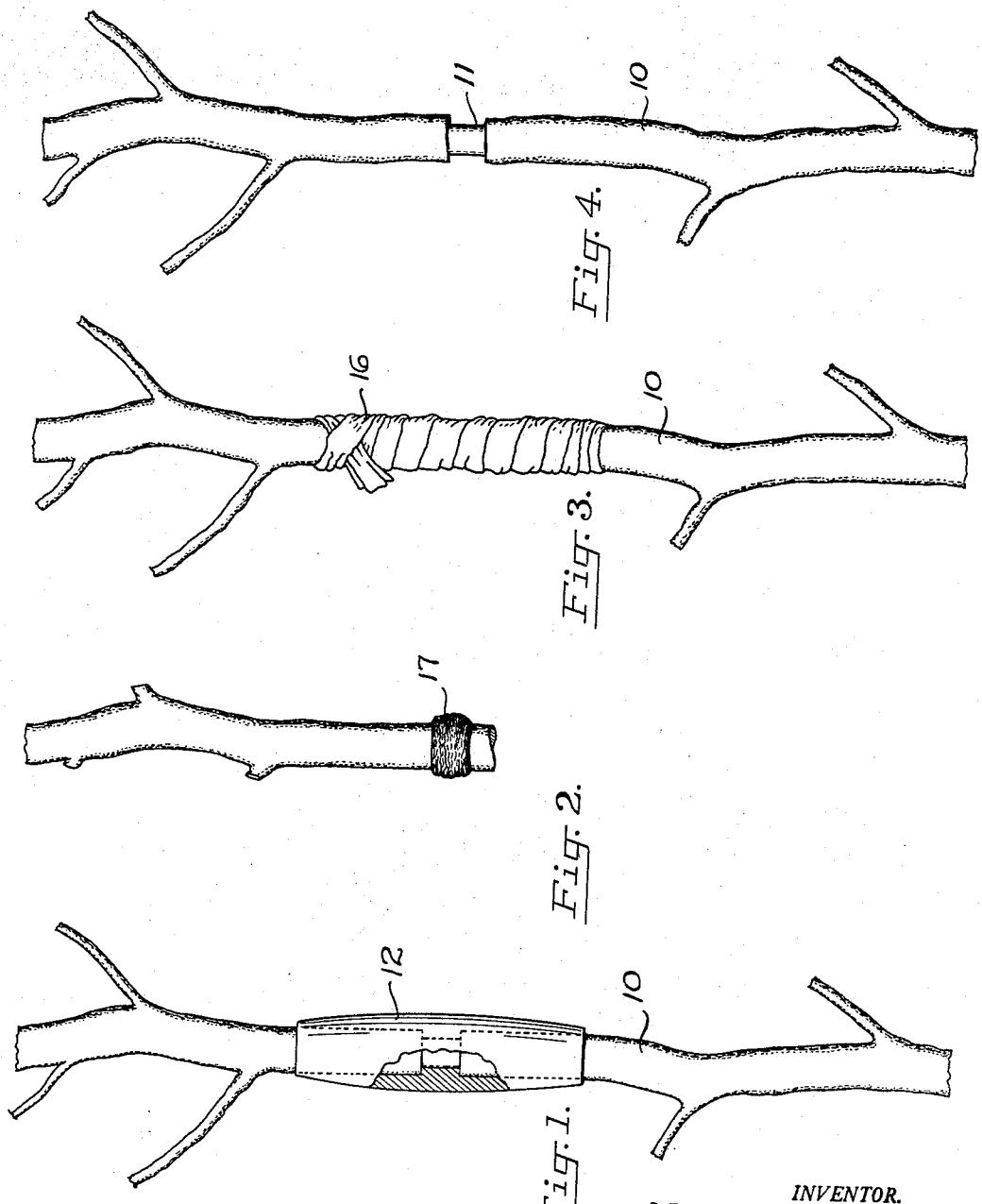

Naomi H. Ruvensky, 1215 N. Holman, Portland 11, Oreg.

Filed Jan. 17, 1958, Ser. No. 709,557

2 Claims. (Cl. 47—58)

This invention relates to growing root material on plants, and more particularly to an improved method for treating plants to produce root material, advantageously used in the propagation of plants or for holding plant cuttings such as cut flowering shrubs so that they have a longer display life in water.

Generally, this invention contemplates an improved method for treating a plant to produce root material thereon which eliminates effort and care during the period that the plant is growing its roots, and which facilitates the formation by a plant of root material of superior quality in a relatively short time.

While this invention may be practiced to propagate roots in a wide variety of different plants, the invention is described hereinbelow in connection with the rooting of rose bushes or trees. It should be understood, however, that it is not intended to be limited specifically to this type of plant, the rose being described for reasons of illustration and not as a limitation.

It is conventional to propagate various forms of plants by mutilating an area of a branch of a living plant, as by girdling the same, and then treating the mutilated area so that root material appears. The advantages of plant propagation in this way include the production of a new plant of hardier and larger type in a shorter period of time.

According to past practices, an area on the branch of a plant was first mutilated, and then covered in a wrapping of moist soil, moss, or other moist material. The latter provided a medium in which new roots could form. The roots produced by this method took the form of numerous, relatively small, intertangled and dispersed, elongated strands. This method required repeated watering of the earth or other rooting medium and other special precautions, in order that the rooting medium retain its moistness over the period that roots were forming. In most instances a period of from five to six weeks was required for the plant to grow its roots, the plant being cared for constantly over this interim.

There are several disadvantages in growing roots in this manner. These include a considerable amount of labor required in the packaging of the mutilated area with a surrounding layer of soil or moss, and close supervision of the plants during the root growing interval. This invention contemplates an improved method for growing roots which eliminates most of the labor associated with known methods including the necessity for moist packing material and the need for carefully tending the plants. The invention also makes possible the growth of superior type plant roots in materially shorter periods of time and the propagation of small and miniature size plants which could not be propagated according to known methods.

According to this invention, a branch of a living plant is first mutilated, as by girdling the branch so as to remove the bark and cambium layer therefrom. The mutilated area is then wrapped in an enveloping, snugly fitting, substantially water and air tight covering. The covering conforms over its inner surface substantially to the contour of the area mutilated. Contrary to past practices, no soil or moss is included around the mutilated area. By excluding soil or moss, the plant continues to draw its requirements for nourishment from its principal roots, rather than from any external media applied to the mutilated area. The water and air tight nature of the covering enables the plant sap to travel up the branch of the plant without dilution from outside water, and without drying of the plant sap.

The root formation which a plant produces using the method of this invention resembles a callus having the same properties as a fibrous root and when severed from the parent plant will send out a multiple of nonfibrous feeding roots. Rose bush branches having a root callus produced by treatment in the manner of this invention may be cut and planted to produce a new plant in a little over a week, as compared to five or six weeks using former methods.

The covering used is comprised of flexible and easily stretched material which snugly envelopes the mutilated area while yieldably accommodating expansion of the covering as root material grows thereunder. Without elasticity, strangulation of the root formation occurs. The flexible elastic nature of the covering also functions to maintain a tight fit about the mutilated area.

Other novel features, objects, and advantages of the invention will become more fully apparent as the following description is read in conjunction with the accompanying drawings wherein:

Fig. 1 illustrates a branch of a rose plant with stem portions removed prepared for root formation as contemplated by this invention;

Fig. 2 illustrates a finished cutting such as may be used for planting in the ground prepared by the method of this invention;

Fig. 3 illustrates an alternate form of the covering for the mutilated area of a branch; and Fig. 4 illustrates a girdled plant branch prior to covering of the girdled area.

Referring now to the drawings, in the practice of this invention, a branch of a living plant 10 is first mutilated, as by girdling the branch at 11, to remove the bark and the cambium layer therefrom. Girdling of the branch produces a larger and better root formation. In the usual instance, with a rose branch a girdled area having a width of from one-quarter to one-half of an inch in width is highly satisfactory.

After removing the bark and the cambium layer, the mutilated area is covered by enveloping the area in a snugly fitting covering 12, as shown in Fig. 1. Covering 12 extends over adjacent portions of the branch to each side of the mutilated area, to insure that the surface which has been scarified is tightly covered, and will remain so as root growth forms.

The material used for covering the girdled portion is flexible, and easily stretched or elastic. When the covering is made it is fitted snugly about the branch so that its inner surface conforms substantially to the contour of the mutilated area and adjacent portions of the branch. Since the covering is elastic, it yieldably expands thereby to accommodate growth of root material therebeneath, while still snugly and tightly fitting about the branch and the root growth forming thereunder. A covering without elasticity strangles the root growth whereas a covering with no flexibility or pliability cannot be fitted tightly about the mutilated area. Without a snug fit, water and air can travel to the mutilated area, so as to produce dilution of the plant sap or drying up of the sap, which is harmful.

An ideal material for covering the mutilated area is common and conventional modeling clay used by artists and sculptors. Modeling clay is water insoluble, pliable and tractable and readily molded by the fingers, and gives readily as root growth forms. For all practical purposes, a substantially water and air tight covering may be prepared using the clay. In preparing a covering, a cylindrical sleeve is formed as shown in Fig. 1, which extends, in the case of the usual rose bush, about a half an inch to either side of the mutilated area.

Another method of practicing the invention is to cover the mutilated area and portions of the branch to either side of the area with a wrapping comprised of folds of a relatively thin rubbery, sheet strip. By way of example, a rubber strip of about one half inch width and the thickness of the rubber in a toy balloon may be used. This material is wrapped about a branch as shown in Fig. 3, where rubber strip 16 is so wrapped. In Fig. 3, the lower end of strip 16 is anchored under subsequent windings of the strip, while the upper end is knotted under a preceding winding by inserting it under the winding. The covering produced is snug and tight.

The covering, whatever the material selected, follows the contour of the branch. Thus a branch may be mutilated where it bends in an elbow, and good results still be obtained.

In practicing this invention, the plant continues to grow after mutilation. A callus, resembling callus 17 illustrated in Fig. 2, forms at the mutilated area. This callus is made up of hearty root structure, and after only a short period of time, in the case of rose bushes a week or so, may be used as the roots for a new rose plant.

When the root formation has progressed sufficiently to permit planting, the branch is severed below the callus formation, as illustrated in Fig. 2. The foliage is then removed and the cutting is ready to be placed in the ground. The rate of propagation of the root structure may be increased by applying heat or warmth to the mutilated area. Warming of the mutilated area may be produced by using a dark or heat absorbing surface for the covering, so that the covering absorbs the sun's heat and transmits it to the mutilated area. Roughing of the covering will also increase its heat absorbing ability.

In summary, it will be noted that the method of this invention eliminates the need for dirt, moss, or other medium around the root growing area, or the necessity for keeping this material moist. The root growth is produced substantially entirely by food derived from the plant sap itself, the plant drawing its individual requirements from the soil in which it is planted. A callous type root structure is produced, which is strong and hearty.

While there has been described an embodiment of this invention, it is desired to cover all modifications and variations which would be apparent to one skilled in the art and that come within the scope of the appended claims.

It is claimed and desired to secure by Letters Patent:

1. A method of treating a plant to produce callus-type growth thereon consisting in removing a ring of the outer plant tissue from the branch of the living plant thereby to produce a girdled portion thereon, and enveloping an area of the branch comprised of the girdled portion and adjacent branch surface portions to each side of the girdled portion in a snugly fitting substantially water-tight and flexible covering taking the form of a molded sleeve of pliable, nonhardening, and tractable material directly encircling the girdled portion and adjacent branch surface portions, said sleeve having an inner surface that is inert and nonporous and nonroot-permeating, the pliable and tractable nature of the sleeve accommodating enlargement of the plant at said girdled area.

2. A method of treating a plant to produce callus-type growth thereon consisting in removing a ring of the outer plant tissue from the branch of a living plant whereby to produce a girdled portion thereon, and enveloping an area of the branch comprised of the girdled portion and adjacent branch surface portions to each side of the girdled portion in a snugly fitting substantially water-tight and flexible covering taking the form of a relatively thin rubbery sheeting tightly wrapped directly about the girdled portion and adjacent branch surface portions, said covering having an inner surface that is inert and nonporous and thus nonroot-permeating, the rubbery nature of the sheeting accommodating the enlargement of the plant at said girdled portion.

References Cited in the file of this patent

UNITED STATES PATENTS

| 2,572,473 | Grove | Oct. 23, 1951 |
| 2,786,306 | Eaton | Mar. 26, 1957 |

FOREIGN PATENTS

| 986,750 | France | Apr. 4, 1951 |

OTHER REFERENCES

Publication: "Introduction to Plant Physiology" (Curtis et al.). Published 1950 by McGraw-Hill (N.Y.), First Edition. Pages 422, 423, 424, 425, 600, 601 are relied on.

"The Pruning Book" (Bailey), published 1898, by MacMillan (N.Y.). Pages 119 and 120 are relied on.